United States Patent
Kai et al.

(10) Patent No.: US 7,768,598 B2
(45) Date of Patent: Aug. 3, 2010

(54) SUBSTRATE HAVING PATTERN, COLOR FILTER, LIQUID CRYSTAL DISPLAY AND METHOD OF MANUFACTURING COLOR FILTER

(75) Inventors: Teruhiko Kai, Tokyo (JP); Kazuhiro Takada, Tokyo (JP)

(73) Assignee: Toppan Printing Co., Ltd. (JP)

( * ) Notice: Subject to any disclaimer, the term of this patent is extended or adjusted under 35 U.S.C. 154(b) by 250 days.

(21) Appl. No.: 11/897,322

(22) Filed: Aug. 29, 2007

(65) Prior Publication Data

US 2008/0218654 A1 Sep. 11, 2008

(30) Foreign Application Priority Data

Mar. 6, 2007 (JP) ............................ 2007-055453

(51) Int. Cl.
*G02F 1/1335* (2006.01)
(52) U.S. Cl. ..................... 349/106; 349/56; 349/110
(58) Field of Classification Search ................ 349/110, 349/106, 56, 138, 158, 156; 428/141; 29/428
See application file for complete search history.

(56) References Cited

U.S. PATENT DOCUMENTS

| | | | | |
|---|---|---|---|---|
| 6,143,450 | A * | 11/2000 | Sobue et al. | 430/7 |
| 6,677,243 | B2 * | 1/2004 | Okada et al. | 438/706 |
| 6,863,956 | B1 * | 3/2005 | Nakajima et al. | 428/156 |
| 2004/0229139 | A1 * | 11/2004 | Tanaka et al. | 430/7 |

FOREIGN PATENT DOCUMENTS

| | | |
|---|---|---|
| JP | 07-035915 | 2/1995 |
| JP | 07-035916 | 2/1995 |
| JP | 07-035917 | 2/1995 |
| JP | 08-166507 | 6/1996 |
| JP | 09-073010 | 3/1997 |
| JP | 3328297 B2 | 9/2002 |
| JP | 2005-157067 | 6/2005 |
| JP | 2005-352105 | 12/2005 |
| JP | 2006-084911 | 3/2006 |
| JP | 2006-119270 | 5/2006 |
| JP | 2006-163233 | 6/2006 |
| JP | 2006-189550 | 7/2006 |
| JP | 2006-243588 | 9/2006 |
| JP | 2006-251433 | 9/2006 |
| JP | 2006-267821 | 10/2006 |
| JP | 2006-276180 | 10/2006 |
| JP | 2006-284674 | 10/2006 |

* cited by examiner

*Primary Examiner*—Thoi V Duong
(74) *Attorney, Agent, or Firm*—Squire, Sanders & Dempsey L.L.P.

(57) ABSTRACT

A color filter and a method of manufacturing a color filter is provided, wherein fluctuation of chromaticity of a color pattern for every opening can be controlled and the color filter has little color shading. One embodiment of the present invention is a substrate having a pattern comprising a transparent substrate and a grid partition wall pattern formed on the transparent substrate, wherein there are openings partitioned by the grid partition wall pattern, and wherein there is a pass through the grid partition wall pattern between at least two adjacent openings.

17 Claims, 2 Drawing Sheets

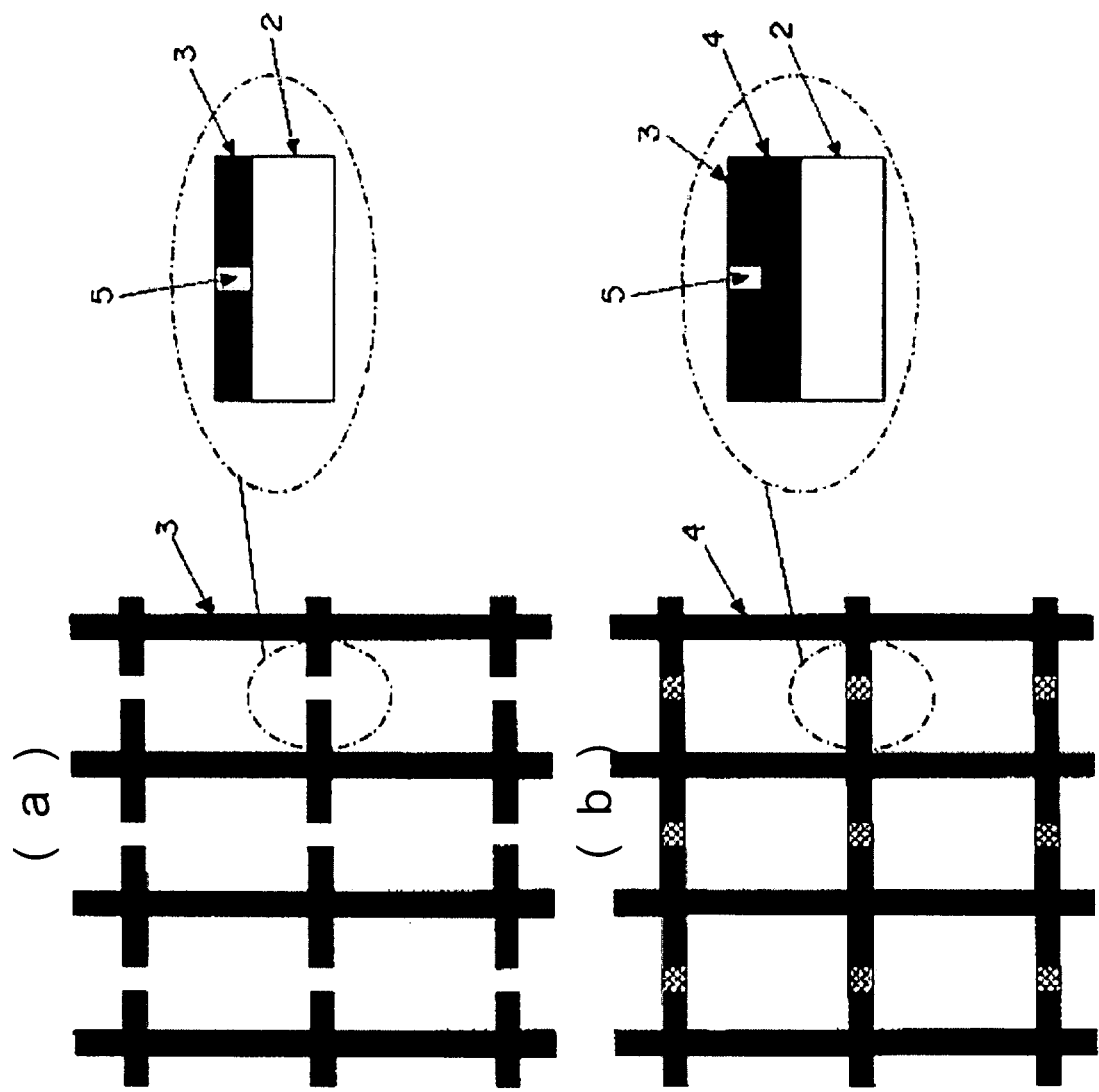
F I G. 2

SUBSTRATE HAVING PATTERN, COLOR FILTER, LIQUID CRYSTAL DISPLAY AND METHOD OF MANUFACTURING COLOR FILTER

CROSS REFERENCE

This application claims priority to Japanese application number 2007-055453, filed on Mar. 6, 2007, which is incorporated herein by reference.

BACKGROUND OF THE INVENTION

1. Field of the Invention

The present invention relates to a substrate having a pattern and a color filter used for a color display device and the like, to a method of manufacturing a color filter, and to a liquid crystal display using them. More particularly, the present invention relates to a substrate having a pattern, a color filter, a method of manufacturing a color filter and a liquid crystal display, wherein a color ink is injected inside an opening partitioned by a partition wall formed on a substrate.

2. Description of the Related Art

In late years, as a method of manufacturing a color filter substrate used for a color display devise such as a color liquid crystal display, an ink jet method has been proposed. (For example, see patent document 1 and patent document 2.) These documents, for example, disclosed that a black matrix including a fluoro-containing compound and/or a silicon-containing compound was used as a partition wall in order to prevent ink bleeding and color mixing in the ink printing step.

In addition, as a partition wall patter, various patterns such as a grid pattern partitioning every pixel and a stripe pattern are well known.

However, there was a problem such that chromaticity of a color pattern every opening fluctuates according to the fluctuation of an amount of an injected ink from every nozzle since a used nozzle is decided according to a corresponding opening in a case where an ink is injected in an opening of a grid partition wall by a ink jet method.

Various patterns such as a stripe pattern are known. However, a stripe pattern is not superior in light shielding performance and is inferior to a grid pattern in contrast.

[patent document 1] Japanese Patent Laid-Open No. 7-35915 Official Gazette

[patent document 2] Japanese Patent Laid-Open No. 7-35917 Official Gazette

SUMMARY OF THE INVENTION

One aspect of the present invention is to provide a color filter and a method of manufacturing a color filter, wherein fluctuation of chromaticity of a color pattern for every opening can be controlled and the color filter has little color shading. One embodiment of the present invention is a substrate having a pattern comprising a transparent substrate and a grid partition wall pattern formed on the transparent substrate, wherein there are openings partitioned by the grid partition wall pattern, and wherein there is a pass through the grid partition wall pattern between at least two adjacent openings.

BRIEF DESCRIPTION OF DRAWINGS

FIGS. 2 (a) and (b) show a process of manufacturing a color filter in accordance to an embodiment of the present invention.

Figure 1:
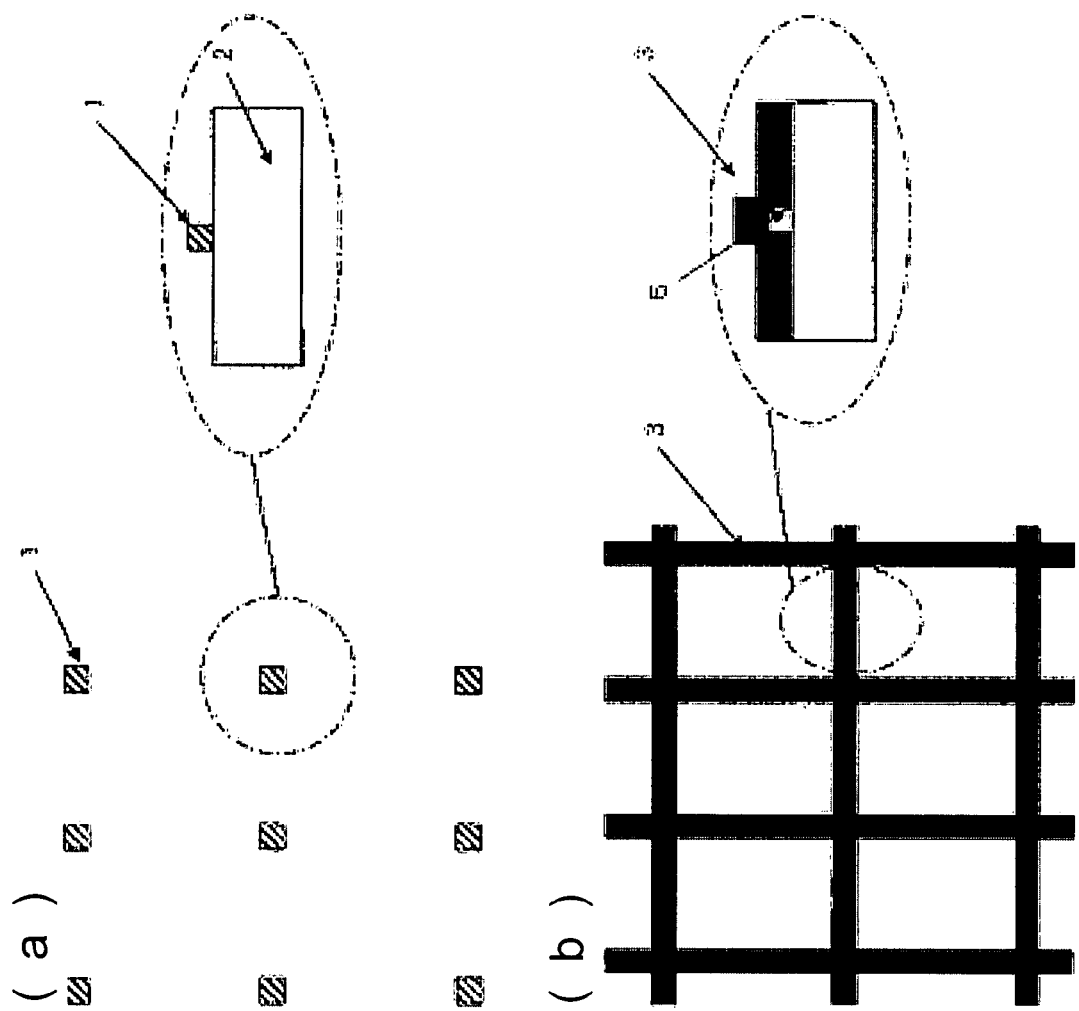
FIGS. 1 (a) and (b) show a process of manufacturing a color filter in accordance to an embodiment of the present invention.

In these drawings, 1 is a positive resist pattern, 2 is a transparent substrate, 3 is a negative resist pattern, 4 is a partition wall pattern, and 5 is a pass for an ink.

DESCRIPTION OF THE PREFERRED EMBODIMENTS

FIGS. 1 and 2 are explanatary drawings showing embodiments of a method of manufacturing a color filter of the present invention. In addition, these embodiments are examples of the present invention and do not limit the scope of the present invention.

FIG. 1 shows a substrate having a pattern, wherein partition wall pattern 4 is formed on substrate 2. Partition wall pattern 4 is provided with pass 5. Pass 5 is formed at a lower part of partition wall pattern 4 while partition wall pattern 4 is formed continuously over pass 5. Height of partition wall part 4 may be identical at any place or may be higher only at a position of pass 5 than other place.

FIG. 2 shows a substrate having a pattern, wherein partition wall pattern 4 is formed on substrate 2. Partition wall pattern 4 is provided with pass 5. Pass 5 is formed at an upper part of partition wall pattern 4. As shown in FIG. 2 (a), pass 5 may be formed over an entire region in a height direction of partition wall pattern 4. As shown in FIG. 2 (b), pass 5 may be formed only at an upper part of partition wall pattern 4.

Since, as for a configuration of partition wall pattern 4 shown in FIG. 1 or FIG. 2 (b), light shielding performance is too high, lowering of contrast due to a bright spot of white color and a leaking light can be little.

In addition, the embodiment shown in FIG. 2 (b) can be easily manufactured compared with the embodiment shown in FIG. 1. In addition, in a case where height of partition wall pattern 4 of the configuration shown in FIG. 1 is identical at any place, since a surface for the next step is flat, management of the next step conditions such as an amount of an applied ink is easy.

In addition, the configuration of FIG. 2 (a) can be easily manufactured.

Examples of substrates used in the present invention include a glass substrate, a quartz substrate, a plastic substrate and the like. However, usable substrates are not limited to these substrates.

As a partition wall pattern used in the present invention, a partition wall pattern formed from a resin type composition can be used.

In addition, partition wall pattern is formed by a photolithographic method, a positive resist and a negative resist can be used. It is desirable that, as a positive resist and a negative resist, a resin containing an amino group, an amide group, a carboxyl group or a hydroxyl group should be used. Examples of the resins include a cresol-novorak resign, a polyvinyl phenol resin, an acryl resin, a metacrylate resin and the like.

In addition, a partition wall pattern used in the present invention can include a light shielding agent. The inclusion of a light shielding agent can allow a substrate having a partition wall pattern to be used as a substrate having a black matrix.

As a light shielding agent, well known materials can be used. Examples of light shielding agents include carbon black, aniline black, black-lead, black iron oxide, titanium oxide, inorganic pigment and organic pigment.

In addition, a partition wall pattern can have an ink repellent property. Examples of methods of providing a partition wall pattern with an ink repellent property include the mixing an ink repellent agent with a partition wall pattern and the ink repellent processing after forming of a partition wall pattern.

Examples of ink repellent agents include materials including an atom of silicon or fluorine, and the like.

An ink repellent processing can be conducted by a plasma processing or a corona processing using a gas being capable of providing an ink repellent property, for example, a gas containing a fluorine or the like.

It is desirable that width of a partition wall pattern should be 5-200 μm. In addition, it is desirable that height of a partition wall pattern should be 1.0-2.5 μm. Further, in a case where a substrate having a black matrix containing a light shielding agent is used, it is desirable that width of a partition wall pattern should be 5-200 μm and height of a partition wall pattern should be 1.0-2.0 μm.

It is desirable that the size of an opening of a partition wall pattern should be 2,000-150,000 μm$^2$.

In addition, it is desirable that diameter (size) of a pass at a partition wall pattern should be 1-20 μm. In a case where diameter (size) of a pass is within the range, an ink can move to an adjacent opening through a pass, thereby, leveling effect is expected.

In addition, in a case where a partition wall pattern has an ink repellent property, it is desirable that diameter (size) of a pass should be 1-50 μm. In a case where diameter (size) of a pass is within the range, an ink can move to an adjacent opening through a pass, thereby, leveling effect is expected. Since a partition wall pattern repels an ink, it is desirable that diameter (size) of a pass should be large without affecting a light shielding performance.

In addition, it is desirable that depth of a pass should be 5-95% of height of a partition wall pattern. In a case where depth of a path is shorter than 5% (more preferably, 40%) of height of a partition wall pattern, it may be difficult for an ink to flow sufficiently through a pass. In a case where depth of a path is greater than 95% (more preferably, 60%) of height of a partition wall pattern, since a partition wall pattern does not exist substantially at a part corresponding to a pass, there is a problem of light shielding property. Shape of cross section of a pass is generally concave, while the shape may be, for example, square, rectangle, semicircle, semielliptic, step-like, multiangular shape, shapes which are formed by combining these shapes, or the like. Planar shape inside a pass, which is a top view, may be a straight line, a diagonal line, a rectangle, convex, concave, step-like, multiangular shape, shapes which are formed by combining these shapes, or the like. In addition, there may be a plurality of passes in one pixel.

A pass can be formed, for example, by a photolithography method. For example, patterning using a positive resist is, beforehand, performed at a position corresponding to a pass of a partition wall pattern on a substrate, thereafter patterning using a negative resist is performed such that the negative resist is formed to be a partition wall pattern, including a pass, on a substrate. In this case, a negative resist is exposed from a rear side of a substrate, thereafter a tunnel-like pass on a substrate can be formed by development. According to this method, a pass can be formed, at low position, on a glass substrate, an ink can be smoothly sent to a pass. In addition, as another method of forming a pass by a photolithography method, first patterning is performed to form a partition wall pattern on a substrate by using a positive resist or a negative resist, thereafter, further, second patterning is performed to form a partition wall pattern thereon by using a positive resist or a negative resist. In this case, it is desirable that a partition wall pattern is formed such that a pass pattern is removed at a partition wall pattern forming process of the first or the second patterning.

A pass can be formed, for example, by the following method: a part of a partition wall is removed by physical methods (for example, polishing, sandblasting, electromagnetic irradiation, laser irradiation) or chemical processes (for example, etching) after a conventional partition wall pattern is formed.

In addition, a pass can be formed, for example, at the same time as forming of a partition wall pattern. In this case, a partition wall pattern can be formed by a photolithography technique using a multi-gradation mask (for example, a halftone mask, a gray tone mask).

Examples of color patterns of the present invention include coloring materials such as a pigment for a color filter and a light emitting material for a EL device (especially, an organic EL device).

For example, in a case of a color filter, a composition including a resin binder and a coloring matter such as a coloring pigment and a dye can be used.

The resin binder secures to fix the partition wall to the substrate and provides an ink resistance to the partition wall. As the binder resin, those resins containing amino group, amide group, carboxyl group, or hydroxyl group are preferred. Specifically, they include, cresol-novolac resin, polyvinyl phenol resin, acryl resin, or methacryl resin. The resin binders may be used each alone or two or more of them may be mixed.

The followings can be used as the coloring pigment in accordance with the color.

The red coloring pigment includes, C.I. Pigment Violet 19, C.I. Pigment Violet 23, C.I. Pigment Violet 29, C.I. Pigment Violet 30, C.I. Pigment Violet 37, C.I. Pigment Violet 40, C.I. Pigment Violet 50, C.I. Pigment Red 7, C.I. Pigment Red 9, C.I. Pigment Red 14, C.I. Pigment Red 41, C.I. Pigment Red 48:1, C.I. Pigment Red 48:2, C.I. Pigment Red 48:3, C.I. Pigment Red 48:4, C.I. Pigment Red 97, C.I. Pigment Red 122, C.I. Pigment Red 123, C.I. Pigment Red 146, C.I. Pigment Red 149, C.I. Pigment Red 177, C.I. Pigment Red 178, C.I. Pigment Red 180, C.I. Pigment Red 184, C.I. Pigment Red 185, C.I. Pigment Red 187, C.I. Pigment Red 192, C.I. Pigment Red 200, C.I. Pigment Red 202, C.I. Pigment Red 208, C.I. Pigment Red 210, C.I. Pigment Red 216, C.I. Pigment Red 220, C.I. Pigment Red 221, C.I. Pigment Red 223, C.I. Pigment Red 226, C.I. Pigment Red 227, C.I. Pigment Red 240, C.I. Pigment Red 246, C.I. Pigment Red 255, C.I. Pigment Red 264, C.I. Pigment Red 272, etc. Further, a mixture of C.I. Pigment Red 254 and C.I. Pigment Red 177 can also be used.

Further, as the green coloring pigment, C.I. Pigment Green 7, and C.I. Pigment Green 36 can be used. Further, a mixture of C.I. Pigment Green 36 and C.I. Pigment Yellow 150, C.I. Pigment Yellow 139, or C.I. Pigment Yellow 13 can be used.

Further, the blue coloring pigment includes C.I. Pigment Blue 15, C.I. Pigment Blue 15:3, C.I. Pigment Blue 15:4, C.I. Pigment Blue 15:6, C.I. Pigment Blue 22, C.I. Pigment Blue 60, etc. Further, the pigments mentioned above may also be used as a mixture of two or more of them.

Hereinafter, one example of a method of manufacturing a color filter of the present invention is described.

A method of manufacturing a color filter comprises the following steps:

At first, a partition wall pattern having an ink repellent property is formed on a substrate. A region partitioned by this partition wall pattern is an opening corresponding to each pixel, in which an ink of each color (i.e. three original colors:

R, G, B.) is injected. In addition, a partition wall pattern is formed by well known methods such as a photolithographic method, a printing method, a transfer method and the like.

Then, a pass for an ink is formed at a partition wall pattern between adjacent pixels of same color. An injected ink moves to an adjacent pixel through this pass for an ink, thereby leveling is conducted. Therefore, if injection fluctuates for every nozzle, chromaticity of a color pattern does not fluctuate, thereby, a color filter without a color unevenness can be manufactured.

A liquid crystal display of the present invention can include a color filter of the present invention and a well-known liquid crystal display member. Examples of well-known liquid crystal display members include a liquid crystal display member described in JP-A-2007-57746.

In the present invention, since a pass connecting openings is formed at a partition wall, an injected ink can flow and move to an adjacent opening through this pass, thereby, leveling effect occurs mutually. Therefore, in a case where an ink is injected an opening partitioned by a partition wall pattern, even if an amount of an supplied ink fluctuate every opening, fluctuation of an amount of ink injected in an opening can be controlled.

In addition, in a case where a color pattern is formed in an opening, fluctuation of chromaticity of a color pattern for every injected opening can be controlled, thereby, a color unevenness does not occur and a color filter has uniform chromaticity.

In an embodiment, fluctuation of an amount of an ink injected in every opening can be controlled even if an amount of a supplied ink fluctuates in every opening, in a case where an ink is injected in an opening.

In an embodiment, a substrate having a partition wall pattern can be used as a substrate having a black matrix.

In an embodiment, color mixing between openings, wherein color mixing between the openings should be prevented, can be prevented when an ink is injected.

In an embodiment, when a color ink is injected in an opening, fluctuation of chromaticity of a color pattern for every opening can be controlled, even if an amount of a supplied ink fluctuates in every opening to some degree.

In an embodiment, fluctuation of chromaticity of patterns of same color, which patterns are partitioned by a partition wall pattern, can be controlled.

In an embodiment, a liquid crystal display can comprise a pixel of each color pattern without fluctuation of a color for every pixel.

EXAMPLE

Hereinafter, two examples, wherein a pass for an ink is formed at a partition wall pattern between adjacent same color regions by a photolithographic method, are described. However, the present invention is not limited to these examples.

Example 1

FIG. 1 shows a process in example 1.

At first, positive resist 1 was applied to transparent substrate (glass) 2, and exposure and development were conducted, thereby, a patterning of a part to be a pass for an ink was conducted (See FIG. 1(a)). Then, negative resist 3 was applied, and exposure and development were conducted, thereby, a grid partition wall pattern was formed.

Subsequently, exposure was conducted entirely through a glass surface, wherein the glass surface was in opposite side of a partition wall pattern formation side, thereafter, development was conducted. At this time, entirely exposed positive resist 1 was dissolved, thereby, a hole at partition wall pattern 4 was formed. The hole was pass 5 for an ink. Finally, these members were burned (See FIG. 1(b)).

Example 2

FIG. 2 shows a process in example 2.

At first, negative resist 3 was applied to transparent substrate 3, and exposure, development and burning were conducted, thereby, a partition wall pattern was formed. At this time, patterning was conducted such that the resist did not remain in a part corresponding to a pass for an ink. That is, a slit was formed in a partition wall pattern, thereby, pass 5 for an ink was formed (See FIG. 2(a)).

Subsequently, negative resist 3 was applied to those members, and exposure, development and burning were conducted, thereby, a grid partition wall pattern, wherein the grid partition wall pattern did not have a pass for an ink, was formed (See FIG. 2(b)).

As a result, partition wall pattern 4 had a part with a step. This step was a pass for an ink. Finally, these members were burned.

Further, after a partition wall pattern was formed as described above, an ink was applied to an opening partitioned by the partition wall pattern, thereby, a color filter was completely manufactured.

At this step, for example, after color inks of plural color elements were injected into an opening of a partition wall pattern, the inks were cured, thereby, color patterns were formed to produce a color filter.

At this time, as a color ink, the thermosetting or photosensitivity resin containing a color pigment was used. Further, a solvent should be superior in temporal stability, drying property and the like and was selected appropriately depending on the relationship with a coloring matter and a resin.

In addition, examples of ink jet apparatuses to be used include a piezo conversion type and thermal conversion type. Especially, a piezo conversion type is preferable.

In addition, it is desirable that an apparatus having an ink granulating frequency of 5-100 kHz, a nozzle diameter of 5-80 μm, three arranged heads and nozzles of 60-500 incorporated in the one head should be used.

As for a color filter manufactured by the above mentioned steps, since a pass for an ink is formed at a partition wall pattern so as to connect adjacent openings, wherein same color ink is injected in the adjacent openings, an injected ink flow and move to an adjacent opening through this pass for an ink, thereby leveling effect occurs mutually. Therefore, even if injection fluctuates every nozzle, color unevenness does not occur and a color filter having a uniform chromaticity can be obtained.

What is claimed is:

1. A substrate having a pattern comprising:
   a transparent substrate;
   and
   a grid partition wall pattern on the transparent substrate,
   wherein openings partitioned by the grid partition wall pattern are formed,
   wherein the grid partition wall pattern has a pass connecting at least two adjacent openings,
   wherein diameter of the pass is 1-20 μm,
   wherein depth of the pass is 40-60% of height of the partition wall pattern
   and wherein the grid partition wall pattern includes a light shielding agent.

2. The substrate having a pattern according to claim 1, wherein width of the pass is equal to or less than width of the grid partition wall pattern.

3. A substrate having a pattern comprising:
a transparent substrate;
and
a grid partition wall pattern on the transparent substrate,
wherein openings partitioned by the grid partition wall pattern are formed,
wherein the grid partition wall pattern has a pass connecting at least two adjacent openings,
wherein diameter of the pass is 1-20 μm,
wherein depth of the pass is 40-60% of height of the partition wall pattern
and
wherein the grid partition wall pattern includes an ink repellent agent.

4. A color filter comprising:
a substrate having a pattern comprising:
a transparent substrate;
and
a grid partition wall pattern on the transparent substrate,
wherein openings partitioned by the grid partition wall pattern are formed,
wherein the grid partition wall pattern has a pass connecting at least two adjacent openings,
wherein diameter of the pass is 1-20 μm,
and
wherein depth of the pass is 40-60% of height of the partition wall pattern
and
a color pattern in the openings partitioned by the grid partition wall pattern.

5. The color filter according to claim 4, wherein the color pattern corresponding to the at least two adjacent openings have the same color.

6. The color filter according to claim 4, wherein the grid partition wall pattern includes a light shielding agent.

7. The color filter according to claim 4, wherein the grid partition wall pattern includes an ink repellent agent.

8. A liquid crystal display comprising the color filter according to claim 4.

9. A substrate having a pattern comprising:
a transparent substrate;
and
a grid partition wall pattern on the transparent substrate,
wherein openings partitioned by the grid partition wall pattern are formed,
wherein the grid partition wall pattern has a pass connecting at least two adjacent openings,
wherein diameter of the pass is 1-20 μm,
wherein depth of the pass is 40-60% of height of the partition wall pattern
and
wherein size of the opening is 2,000-150,000 μm$^2$.

10. A color filter comprising:
the substrate having a pattern according to claim 9;
and
a color pattern in the openings partitioned by the grid partition wall pattern.

11. The color filter according to claim 10, wherein the grid partition wall pattern includes a light shielding agent.

12. The color filter according to claim 10, wherein the grid partition wall pattern includes an ink repellent agent.

13. A liquid crystal display comprising the color filter according to claim 10.

14. A color filter comprising:
a substrate having a pattern comprising:
a transparent substrate;
and
a grid partition wall pattern on the transparent substrate,
wherein openings partitioned by the grid partition wall pattern are formed,
and
wherein the grid partition wall pattern has a tunnel-like pass connecting at least two adjacent openings, the tunnel-like pass being in contact with the transparent substrate,
and
a color pattern in the openings partitioned by the grid partition wall pattern.

15. The color filter according to claim 14, wherein the grid partition wall pattern includes a light shielding agent.

16. The color filter according to claim 14, wherein the grid partition wall pattern includes an ink repellent agent.

17. A liquid crystal display comprising the color filter according to claim 14.

* * * * *